United States Patent Office 2,772,186
Patented Nov. 27, 1956

2,772,186

METHOD OF APPLYING AN EPOXY RESIN TO A BASE AND CURING SAID RESIN

Josef Mollers, Hamburg-Poppenbuttel, and Eberhard Seidel, Hamburg-Eimsbuttel, Germany, assignors to Hartford National Bank and Trust Company, Hartford, Conn., as trustee No Drawing. Application April 1, 1952,
Serial No. 279,938

Claims priority, application Germany June 28, 1951

2 Claims. (Cl. 117—103)

Synthetic resins capable of being hardened by heating have long been known. Such materials to which a particular substance, the hardening medium, is usually added, are generally hardened in a mould, wherein they are previously given the desired shape by moulding, casting or the like in a plastic, preferably liquid phase. Since the hardening operation takes at least several minutes and sometimes even many hours, the mould is occupied all this time, so that duplicate production in considerable numbers requires a large number of such often very expensive moulds.

Among the diverse synthetic materials capable of being hardened by heating and having very different properties in mechanical and electrical respect there are also materials eminently suitable particularly for electrical engineering.

The efforts have for long been directed to providing a material which permits electrical parts such as, for example, capacitors (more particularly small capacitors for low loads, for example for use in radio-receivers) to be furnished with a lacquer-like coating for insulation purposes, this coating possibly satisfying the following conditions:

1. The breakdown strength and the thickness of the layer of lacquer should permit the capacitors to be placed in contact with each other without the occurence of sparking over at the operating voltage prescribed,
2. The loss angle of the capacitor should not be detracted from by the lacquer,
3. The influence of humidity of the air, particularly on the electric properties referred to at 1 and 2 should not be noticeable (tropics proof),
4. The lacquer should be stable at the operating temperature (approximately −50° to +150° C.) and able to withstand the soldering operation (up to 350° C.),
5. The lacquer should permit of being coloured,
6. The lacquer should permit of being applied in a single dipping operation.

The lacquers hitherto known satisfy the aforesaid conditions only in part. Thus, for example, lacquers are known that can be applied in a simple manner, but do not sufficiently satisfy the requirements in electrical respect. On the other hand lacquers have come to be known which satisfy the conditions 1 to 4 important in regard to their use, it is true, but cannot be coloured and/or applied in a single dipping operation, so that they require, for example, to be provided in a plurality of superposed layers.

It has now been found that among the synthetic resins capable of being hardened by heating there are also resins which are particularly suitable for insulating coatings with regard to the conditions 1 to 5. These latter resins are generally referred to as so-called casting resins, i. e., resins which are to be employed in a casting process in the form of a thin liquid and which can be hardened or cured by heating. An example of such a resin is one comprising "Araldit B," a registered trademark for a condensation product of poly-arylethylene oxide derivatives, and "Harter 901," a registered trademark for phthalic anhydride mixed with some coloring matter, both materials being manufactured by the firm Ciba A. G. of Basel.

According to the methods hitherto known such casting resins were generally hardened or cured at temperatures between 100 and 200° C., the resins becoming so thinly liquid so an insulating layer applied, for example, by dipping, tends to drip down. For this reason, the hardening or curing must take place in moulds, which is complicated and uneconomical, particularly for small mass production articles, such as capacitors.

According to the invention a material capable of being hardened by heating, preferably a casting resin of the thermosetting type, is hardened or cured at a temperature variable with time such that the viscosity of the material is not less than a given minimum value during the hardening operation, so that during the hardening operation the material, without using moulds, does not lose a given shape, particularly the shape of a layer applied by dipping.

It is quite possible to harden such a casting resin at a constant temperature such that the viscosity is not less than the desired minimum value at the outset of the hardening operation, but in this case, the hardening takes considerable time, which is detrimental to manufacture and uneconomical.

In order to avoid supervision of time and temperature in carrying out the method according to the invention, it is advisable that the hardening operation should be effected in one or more temperature steps, the first step at a low temperature for a considerable time and the following steps at a higher temperature for a short time.

The best temperature steps conform to the material used and the desired minimum viscosity and may easily be determined by short preliminary tests.

It is particularly advantageous to use the method according to the invention for the manufacture of synthetic resin castings, particularly of mass-production articles which do not require great accuracy in regard to size since in this case they need not be hardened in moulds. The parts may, for example, be shaped by casting or diecasting from liquid synthetic resins and be removed from the mould after stiffening, by cooling, to the required degree to retain their shape. The ultimate hardening or curing operation may subsequently take place in the aforesaid manner and a large number of castings, for example, made in the same mould, may be hardened simultaneously.

In manufacturing such parts of synthetic resin the starting material may, as an alternative, be shaped in the solid to plastic state by moulding, turning and stamping them in succession, a large number of articles thus shaped being hardened or cured simultaneously at different temperatures.

The hardening method according to the invention is particularly advantageous for applying a lacquer-like coating consisting of a material, particularly synthetic resin, capable of being hardened by heating on to electrical parts, for example capacitors. To this end synthetic material capable of being hardened may be used as a dipping lacquer by making it thinly liquid under the action of heat to such a degree as to permit the lacquer-like coating to be applied to the required thickness, in one dipping operation the synthetic material being subsequently cured in the aforesaid manner.

In order that the invention may be more readily carried into effect it will now be described in greater detail by giving an example, in which a soldering proof, blue layer or lacquer is applied to capacitors.

As a starting material use is made of "Araldit Giessharz B" and "Härter 901" (commercially sold by the firm Ciba A. G. of Basel), ultramarine blue and titanium dioxide ($TiO_2$).

Ultramarine blue and titanium dioxide are freed from humidity of the air by heating for one hour to 120° C. while stirring repeatedly. The "Araldit" is reduced to powder.

For the production of 100 g. capacitor lacquer (sufficient for coating approximately 200 capacitors) the following materials are mixed:

49 g. "Araldit" with
25 g. ultramarine blue
5 g. titanium dioxide and
21 g. "Härter 901."

This mixture is placed in a sand bath maintained at 130° C. After melting it is stirred for a short time (stirring for a long time involves the intake of air). After waiting 5 minutes a capacitor is dipped into the mixture, it being advisable to wet the junction conductors as little as possible. The capacitor is then lifted from the melt and so much of the liquid material is allowed to drip down in the warm ambience that only a big drop remains at the end of the capacitor, which drop may be caused to spread uniformly by turning. The capacitor is then removed from the melting vessel and in a few seconds the coating will harden at room temperature to such a degree that the capacitor with the junction conductors can be inserted in a perforated plate.

Capacitors thus coated with lacquer are hardened or cured as follows:

|  | Degrees centigrade |
|---|---|
| 23 hours at | 55 |
| 15 hours at | 60 |
| 3 hours at | 80 |
| 3 hours at | 100 |
| 3 hours at | 120 |

47 hours

When the temperature is accurately controlled the lacquer will no longer flow. After the aforesaid step-hardening operation, a hot soldering iron at moderate pressure leaves only a point of reduced lustre on the layer of lacquer.

What we claim is:

1. A method of applying a thick resinous coating to a shaped article comprising the steps immersing a shaped article in a solvent-free hot coating composition consisting essentially of a molten ethoxyline casting resin, removing the thus coated object from the hot coating composition and cooling said coating at room temperature for a time sufficient to cause said coating to be sufficiently viscous to maintain the form of the shaped object, heating said coated object through a number of increasing temperature ranges starting at a temperature of about 55° C. and ending at a temperature of about 120° C., for a total period of time sufficient to cure said resin, each of said temperature ranges being of a duration insufficient to liquefy said coating.

2. A method of applying a thick resinous coating to a shaped article comprising the steps immersing a shaped article in a solvent-free hot coating composition consisting essentially of a molten ethoxyline casting resin and phthalic anhydride, removing the thus coated object from the hot coating composition and cooling said coating at room temperature for a time sufficient to cause said coating to be sufficiently viscous to maintain the form of the shaped object, heating said coated object through a number of increasing temperature ranges starting at a temperature of about 55° C. and ending at a temperature of about 120° C., for a period of time sufficient to cure said resin, each of said temperature ranges being of a duration insufficient to liquefy said coating.

References Cited in the file of this patent

UNITED STATES PATENTS

| 1,125,906 | Hemming | Jan. 19, 1915 |
| 1,358,394 | Redman | Nov. 9, 1920 |
| 1,508,124 | Richardson | Sept. 9, 1924 |
| 2,350,742 | Fordyce | June 6, 1944 |
| 2,500,600 | Bradley | Mar. 14, 1950 |

OTHER REFERENCES

Ciba, "Araldite" received March 13, 1952.